Nov. 24, 1942. O. N. GREDELL 2,303,311
COUPLING FOR THIN WALL TUBING
Filed Feb. 3, 1941 2 Sheets-Sheet 1
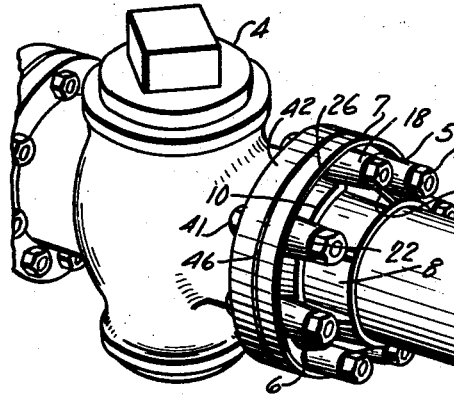
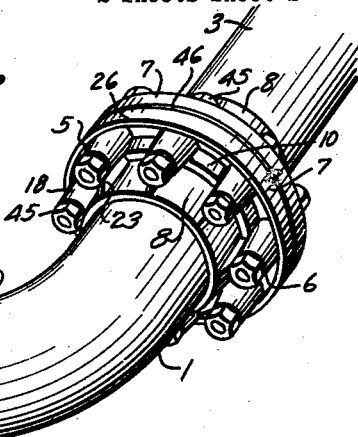
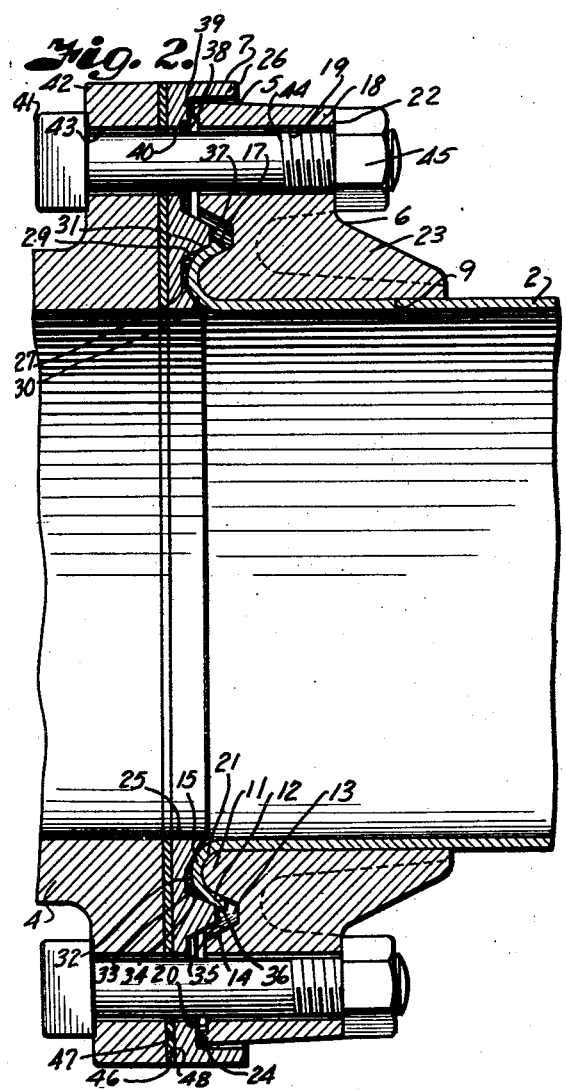
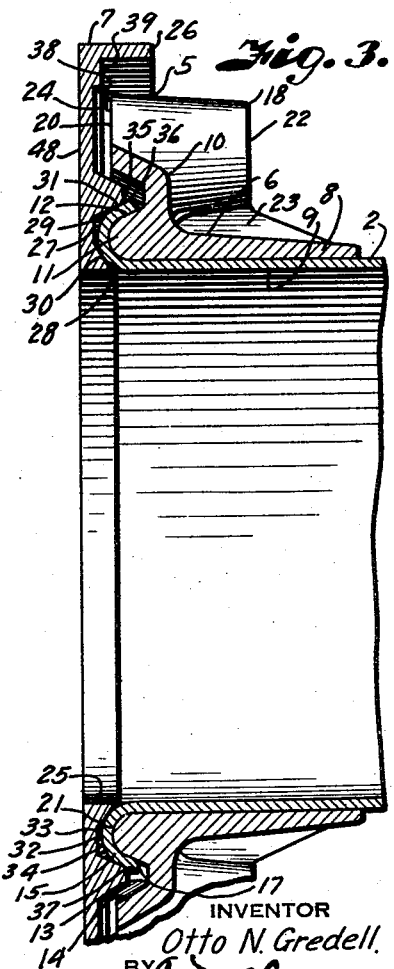
INVENTOR
Otto N. Gredell.
BY
ATTORNEY Nov. 24, 1942.   O. N. GREDELL   2,303,311
COUPLING FOR THIN WALL TUBING
Filed Feb. 3, 1941   2 Sheets-Sheet 2
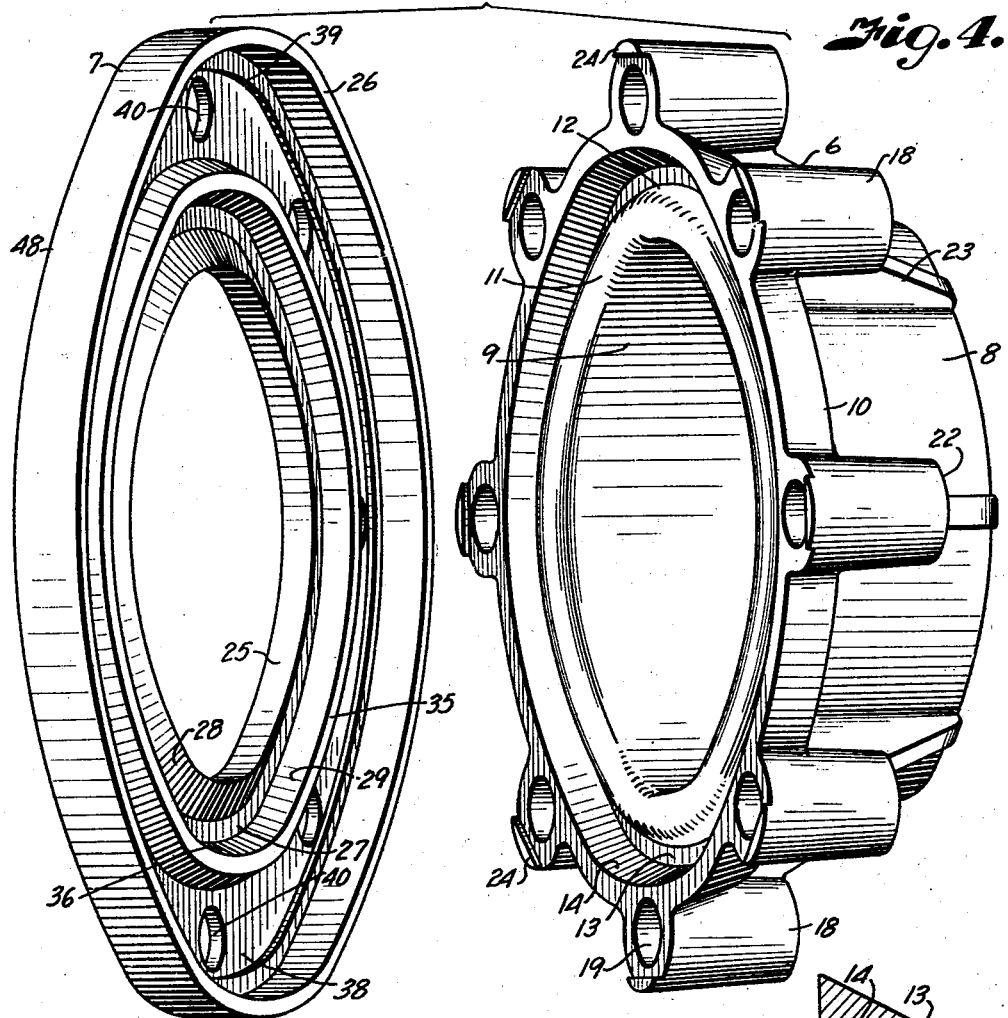
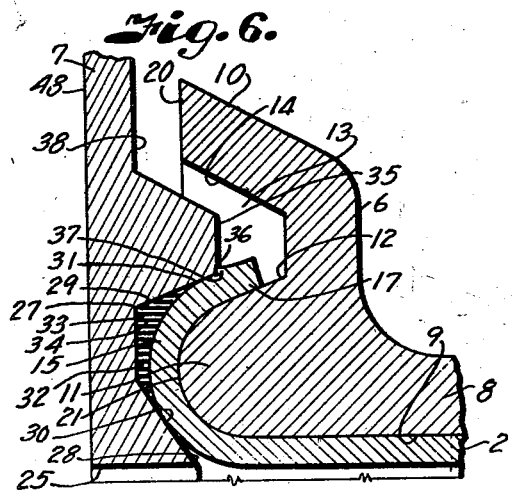
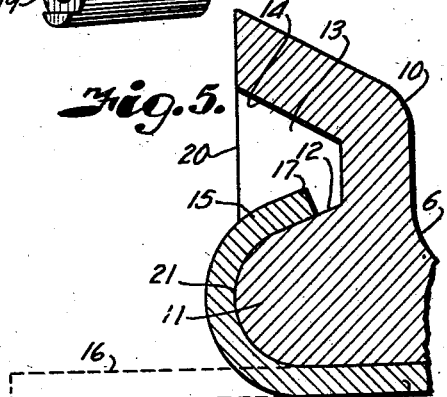
INVENTOR
*Otto N. Gredell.*
BY
ATTORNEY Patented Nov. 24, 1942

2,303,311

UNITED STATES PATENT OFFICE 2,303,311

COUPLING FOR THIN WALL TUBING

Otto N. Gredell, Kansas City, Mo., assignor to Standard Steel Works, North Kansas City, Mo., a corporation of Missouri Application February 3, 1941, Serial No. 377,087

8 Claims. (Cl. 285—140)

This invention relates to pipe couplings, particularly of a type for connecting large diameter thin wall tubing formed of metal, such as aluminum, and has for its principal object to provide a coupling of this character which forms a leak-tight joint with a tubing incidental to connection thereof.

Other objects of the invention are to provide a coupling which includes a pair of clamping rings, one of which provides a seat for a formed flange on the tubing and the other a shear edge for effecting a shear contact around the marginal edge of the flange to assure a positive seal incidental to draw up of the rings; to provide the pipe engaging coupling ring with a collar for supporting the thin wall tubing and prevent weaving movement thereof near the point of the seal; and to provide a coupling construction which permits the use of a sealing compound without interference with the seal effected by the shear contact.

It is a further object of the invention to provide a coupling for thin wall tubing having high strength and low weight ratio.

In accomplishing these and other objects of the invention, as hereinafter pointed out, I have provided improved structure, the preferred form of which is illustrated in the accompanying drawings, wherein:

Fig. 1 is a perspective view of a duct formed of sections of thin wall tubing connected with couplings constructed in accordance with the present invention.

Fig. 2 is a longitudinal section through a coupling taken on a diametrical plane extending through the draw-bolts.

Fig. 3 is a similar view with the section being taken on a diametrical plane intermediate the draw-bolts.

Fig. 4 is a detail perspective view of the parts of the coupling shown in disassembled spaced relation.

Fig. 5 is a fragmentary section showing formation of the gripping flange on the tubing.

Fig. 6 is a similar fragmentary section showing the formed flange and the shear contact effected upon draw-up of the coupling members.

Referring more in detail to the drawings:

1 designates a conduit composed of relatively light weight thin wall tubing, such as aluminum, which may be formed of intercoupled sections 2 and 3 having connection, for example, with a valve or other fitting 4. Owing to the thin wall and relatively large diameter of such tubing it is difficult to couple the sections and connect them with rigid bodies such as the valve 4 because of the impracticability of threading or welding such tubing and the difficulty of connecting coupling collars therewith. I have, therefore, provided an improved construction for interconnecting thin wall tubing sections or for connecting such tubing with required fittings by means of couplings 5, as now to be described.

Each coupling includes mating clamping rings 6 and 7. The ring 6 encircles the tubing and has a collar 8 having an inner cylindrical face 9 adapted to closely engage and support the exterior face of the tubing and of sufficient length to provide an adequate contact area for preventing weaving of the tubing within the collar. Formed on an end of the collar, circumferentially of the tubing and extending radially thereof, is a flange 10 having a bead 11 provided with a seating face of substantially semi-circular cross-section with the outer circumference thereof terminating in an inclined face 12. The face 12 forms one side of a substantially V-shaped groove 13 which extends circumferentially on the bead 11 and has its opposite face 14 spaced from the face 12 a sufficient distance to accommodate a flange 15 on the tubing.

The flange 15 is formed by peening or spinning a projecting end 16 of the tubing, shown by the dotted lines in Fig. 5, over the bead 10 so that the flange closely engages the bead and has a marginal edge overlying the inclined face 12 as shown in Fig. 5.

Formed on the circumference of the ring 6, in spaced relation with the groove 13, are a plurality of cylindrical bosses 18 having axial bores or openings 19 extending parallel with the axis of the ring and having flat ends 20 located in substantial plane with the face portion 21 of the ring flange 10. The bosses 18 have flat faces 22 at their opposite ends adapted to be engaged by the nuts or heads or fastening devices, later described. The bosses are connected with the collar of the ring by webs 23 to enhance the rigidity thereof and at the same time provide a light weight construction. The outer portions of the ends 20 may be provided with lugs 24 located outwardly with respect to the bores 19.

The ring member 7 is of plate-like character and has an inner circumferential face 25 substantially conforming in diameter to the tubing, and an outer circumferential flange 26 extending over the bosses 18 of the ring 6. Formed in the face of the ring 7, in registry with the flange 15, is an annular recess 27 having inner and outer inclined wall portions 28 and 29 adapted to tangentially engage, as at 30 and 31, the inner face of the tubing flange 15. The annular recess 27 has a substantially flat bottom portion 32 spaced from the flange 15 on the tubing to form a pocket 33 for a plastic sealing compound 34. The inclined wall 29 intersects with a flat circumferential face 35 of the ring to form a relatively sharp circumferential knife or shearing edge 36 adapted to contact that portion of the marginal edge of the tubing which overlaps the inclined face 12 near the outer tangential contact point 31 to make a circumferential shear-like cut 37 in the tubing flange when the rings are drawn together. The shearing edge 36 therefore establishes a continuous line of cut on the flange 15, which exactly corresponds to the shearing edge and effects a positive seal between the tubing and the ring 6. It is thus obvious that the shear edge produces a positive contact with the tubing regardless of any irregularities in the surface thereof or variation in the wall thickness for the reason that the shear edge scrapes the metal of the flange to provide its own seat. The ring 7 has a circumferential recess 38 extending in outer spaced relation with the recess 27 to accommodate the circumferential flange 10 on the member 6 and receive the bosses 18 so that the flange 26 may project thereover as shown in Fig. 2. The recess 27 is of sufficient depth to provide clearance between the end faces of the lugs 24 and an annular shoulder 39 that is formed in the bottom of the recess 27 and which extends circumferentially of a series of openings 40 registering with the bores 20 of the bosses 18 to pass suitable fastening devices therethrough, such as bolts 41.

When the coupling is connected with a valve or similar fitting 4, the flange 42 of the fitting is provided with openings 43 which register with the openings 40 and the shanks 44 of the bolts 41 may be projected through the openings 43 and 40 and through the bores 19 to draw the parts together when nuts 45 are turned on the threaded ends of the bolts. If desired, a gasket 46 may be inserted between the face 47 of the flange 42 and the corresponding face 48 of the ring 7.

Where the adjoining tubing sections 2 and 3 are connected with a coupling embodying the features of my invention, each of the tubings 2 and 3 is provided with a ring 6, and the rings 7 are placed in abutting contact and drawn together and into contact with the flanges on the tubing by fastening devices similar to the fastening devices 41.

In making up a connection with a coupling constructed in accordance with the present invention, a ring 6 is sleeved over an end of the tubing so that a portion of the tube sufficient to form the flange projects beyond the bead 11. The projecting portion 16 of the tubing is then spun or peened over the bead so that it closely engages the circular face thereof and the marginal edge 17 is seated against the inclined face 12. The ring 7 is then applied so that the circumferential faces of the inclined wall portions 28 and 29 of the recess 27 substantially tangentially contact the formed flange 15. When the rings are thus assembled, a shear edge 36 is in position to make a shear cut 37 when the rings are drawn together upon tightening of the bolts 41 but the inner portion 28 is then slightly spaced from the flange. The bolts 41 are then passed through the bolt openings and the nuts 45 applied to draw the parts together and establish the shear contact which effects a draw in the flange over the bead 11 and brings the inner wall portion 28 into clamping contact to retain the draw. By effecting the shear, it is obvious that a clean and intimate contact is made between the clamping ring 7 and the tubing to provide a leak-tight joint. If desired, the shear and tangential contacts may be supplemented by inserting the plastic material 34 in the pocket prior to tightening the bolts.

When the bolts are properly tightened, the lugs 24 are spaced from the shoulder 39, but should the bolts be drawn up exceedingly tight the lugs engage the shoulder and avoid springing of the rings out of shape.

From the foregoing it is obvious that I have provided a coupling which effectively connects thin wall tubing and provides a positive seal incidental to draw-up of the coupling rings.

What I claim and desire to secure by Letters Patent is:

1. A coupling for thin wall tubing including, a ring having a collar portion adapted to be sleeved upon the end of the tubing and having an annular bead on which a flange on the end of the tubing is adapted to be seated, a complementary ring having spaced concentric annular portions adapted to contact said flange at inner and outer circumferential points thereon, the outer of said portions having a shear edge for effecting shear contact on the marginal edge of said flange, a pocket for a sealing compound between said points of contact, and fastening means for drawing said rings together to effect said shear contact and to clamp the inner annular portion against said flange.

2. A coupling for thin wall tubing including, a ring member having a collar portion sleeved upon the tubing and having an annular bead of substantially semi-circular cross-section and terminating at the base thereof in an inclined portion arranged substantially tangential therewith, a flange on said tubing similar in shape to said bead for support on said bead, a complementary clamping ring having inner and outer portions tangentially contacting said tubing flange at inner and outer circumferential points over said bead, said outer of the portions having a shear edge for effecting a shear cut on the marginal edge of said flange which is supported by said tangential inclined portion, and means for drawing said rings together to clamp said tubing flange and effect said shear contact.

3. A coupling for thin wall tubing including, a ring having a collar portion adapted to be sleeved upon the end of the tubing and having an annular bead over which the end of the tubing is adapted to be formed to provide a flange on said tubing, a complementary ring having spaced contact portions tangentially engaging said formed flange of the tubing at inner and outer circumferential points on said flange and having a shear edge for effecting a shear cut on the marginal edge of said flange, said contact portions cooperating with said flange to form a confined pocket between said spaced contact portions for receiving plastic sealing compound, and means for drawing said rings together to clamp said flange and effect said shear cut.

4. A coupling for thin wall tubing including, a ring member having a collar portion sleeved upon one end of the tubing and having an annular bead, a flange on said tubing having a cross-sectional shape matching said bead, a complementary ring having spaced annular contact portions engaging said flange of the tubing at inner and outer circumferential points on said flange, the outer of said contact portions being arranged to contact said flange prior to contact of the inner contact portion to effect a draw of said flange over the annular bead when the rings are drawn together, and means for drawing said rings together to effect said draw and to bring said contact portions into clamping engagement with the flange to retain said draw.

5. A coupling for thin wall tubing including, a ring member having a collar portion sleeved upon an end of the tubing and having an annular bead, a flange on said tubing having a cross-sectional shape matching said bead, a complementary ring having spaced inner and outer annular contact portions engaging said flange of the tubing at inner and outer circumferential points on said flange, the outer of said contact portions having an annular shear edge arranged to contact said flange prior to contact of the inner contact portion to effect a shear in said flange and to cause draw of said flange over the annular bead when the rings are drawn together, and means for drawing said rings together to effect said draw and for bringing the inner contact portion into clamping engagement with the flange to maintain said draw.

6. A coupling for thin wall tubing having an end thereof flanged outwardly and terminating in a retractively flaring annular rim encircling the body of the tubing and spaced therefrom, a ring sleeved upon the body of the tubing and having an annular bead backing said flange and forming a support for said rim, a cooperative clamping ring having an annular shear edge forming a shear contact with said rim when the rings are drawn together, and means for drawing the rings together.

7. A coupling for thin wall tubing having an end thereof curving outwardly and retractively to form an annular flange terminating in a rim spaced from the body of the tubing, a ring encircling said tubing and having an annular bead supporting said flange and rim relative to the body of said tubing, a cooperative clamping ring having a bore substantially conforming to the inner diameter of the tubing and provided with a clamping rib encircling the bore and engaging the portion of the flange curving outwardly from the body portion of the tubing, said cooperative ring having a shear edge for effecting a shear contact with said rim, and means for drawing the rings together to effect gripping engagement of the clamping rib and to effect said shear contact for forming a seal between said rim and said shear edge.

8. A coupling for connecting thin wall tubing having an outwardly and rearwardly curving flange on the end thereof terminating in a flaring rim, a ring encircling the body of the tubing and having an annular rib backing said flange and supporting said rim, and a cooperative clamping member having a bore substantially conforming to the inner diameter of the tubing and provided with an annular groove encircling said bore and forming an inner inclined clamping face cooperating with said rib to clamp the tubing flange therebetween and having an oppositely inclined outer face forming a shear edge with a face of said ring and adapted to effect a shear cut on the rim of said flange, and means for drawing the rings together to effect said clamping of the flange and a seal between said shear edge and said rim.

OTTO N. GREDELL.